UNITED STATES PATENT OFFICE.

RICHARD KOTHE, OF VOHWINKEL, OSCAR DRESSEL, OF ELBERFELD, AND HEINRICH HOERLEIN, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

ORANGE WOOL-DYE.

1,005,233.   Specification of Letters Patent.   Patented Oct. 10, 1911.

No Drawing.   Application filed May 17, 1911.  Serial No. 627,810.

*To all whom it may concern:*

Be it known that we, RICHARD KOTHE, residing at Vohwinkel, near Elberfeld, OSCAR DRESSEL, residing at Elberfeld, and HEINRICH HOERLEIN, residing at Vohwinkel, near Elberfeld, Germany, doctors of philosophy, chemists, citizens of the German Empire, have invented new and useful Improvements in Orange Wool-Dye, of which the following is a specification.

Our invention relates to the manufacture and production of new azo dyestuffs suitable for dyeing wool which are obtained by combining the diazo compounds of aminoarylsulfonamids with acidylized aminonaphthol sulfonic acids. The new dyestuffs having most probably the general formula:

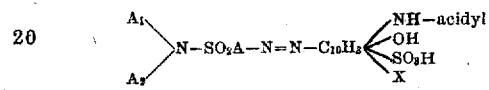

($A$=aryl, $A_1$ and $A_2$=hydrogen or a substituent, $X$=hydrogen or a sulfonic group) are after being dried and pulverized in the shape of their alkaline salts from yellowish-red to violet powders soluble in water and in concentrated sulfuric acid with from an orange to red to violet color; yielding upon reduction with stannous chlorid and hydrochloric acid an aminoarylsulfonamid and a diaminonaphthol sulfonic acid. They dye wool from orange to blue-red shades which are remarkable for their excellent fastness to milling, washing and light.

In order to illustrate the new process more fully the following example is given, the parts being by weight:—29.2 parts of 2-toluidin-4-sulfon-ortho-anisidid

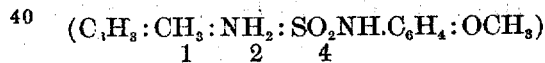

are diazotized. The diazo compound is then added to an aqueous solution, containing an excess of sodium carbonate, of 30.5 parts of the sodium salt of 2-acetylamino-5-naphthol-7-sulfonic acid. After the combination is finished the dye is precipitated with common salt, then filtered off and dried. It is after being dried and pulverized in the shape of its sodium salt a red powder having most probably the formula:

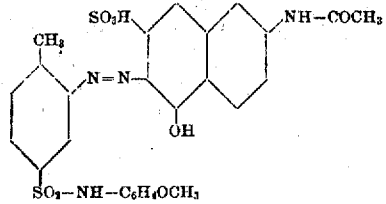

soluble in water with an orange-red and in concentrated sulfuric acid with a red color. It dyes wool from acid baths brilliant orange even shades fast to light and to milling. Upon treatment with stannous chlorid and hydrochloric acid it is split up, 2-toluidin-4-sulfon-ortho-anisidid and 2.6-diamino-5-naphthol-7-sulfonic acid being obtained.

The process is carried out in an analogous manner on starting from other sulfonamids, *e. g.* aminophenylsulfonamid $$(NH_2C_6H_4-SO_2.NH_2)$$

2-toluidin-4-sulfontoluidid:

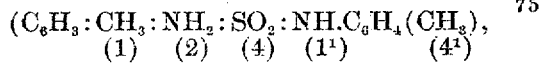

4-toluidin-2-sulfonyl-1-naphthylamin-5-sulfonic acid:

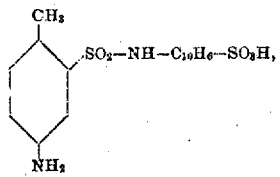

2-anisidin-4-sulfon-para-toluidid, 4-toluidin-2-sulfoncresidid:

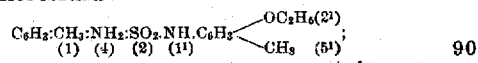

etc., the 2-acetylamino-5-naphthol-7-sulfonic acid mentioned in the example can be replaced by other acidylaminonaphthol sulfonic acids, *e. g.* 2-acetylamino-8-naphthol-6-sulfonic acid, 1-benzoylamino-8-naphthol-3.6-disulfonic acid, 1-acetylamino-8-naphthol-6-sulfonic acid, etc.

We claim:—

1. The herein described new dyestuffs obtainable from diazo compounds of aminoarylsulfonamids with acidylized aminonaphthol sulfonic acids, which dyes are after being dried and pulverized in the shape of their alkaline salts from orange to reddish-brown powders soluble in water and in concentrated sulfuric acid with from an orange to red color; yielding upon treatment with stannous chlorid and hydrochloric acid an aminoarylsulfonamid and a diaminonaphthol sulfonic acid and dyeing wool from acid baths from orange to red shades, substantially as described.

2. The herein described new dyestuff having most probably the formula:

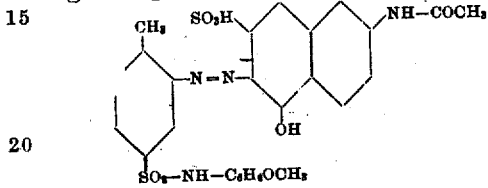

which is after being dried and pulverized in the shape of its sodium salt a red powder soluble in water with an orange-red and in concentrated sulfuric acid with a red color; yielding upon reduction with stannous chlorid and hydrochloric acid 2-toluidin-4-sulfo-ortho-anisidid and 2.6'-diamino-5-naphthol-7-sulfonic acid and dyeing wool from acid baths brilliant orange shades, substantially as described.

In testimony whereof we have hereunto set our hands in the presence of two subscribing witnesses.

RICHARD KOTHE. [L. S.]
OSCAR DRESSEL. [L. S.]
HEINRICH HOERLEIN. [L. S.]

Witnesses:
CHAS. J. WRIGHT,
ALBERT AUFER.